(12) United States Patent
Liu et al.

(10) Patent No.: US 10,789,911 B2
(45) Date of Patent: Sep. 29, 2020

(54) PHASE LOCKED MULTI-DISPLAY SYNCHRONIZATION

(71) Applicant: Microsoft Technology Licensing, LLC, Redmond, WA (US)

(72) Inventors: Wenfeng Liu, Woodinville, WA (US); Kari Jussi Ropo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 16/216,856

(22) Filed: Dec. 11, 2018

(65) Prior Publication Data
US 2020/0184929 A1   Jun. 11, 2020

(51) Int. Cl.
*G09G 5/12* (2006.01)
*G06F 3/14* (2006.01)

(52) U.S. Cl.
CPC ............. *G09G 5/12* (2013.01); *G06F 3/1454* (2013.01); *G09G 2320/02* (2013.01); *G09G 2360/12* (2013.01)

(58) Field of Classification Search
CPC .. G09G 5/12; G09G 2320/02; G09G 2360/12; G06F 3/1454
See application file for complete search history.

(56) References Cited

U.S. PATENT DOCUMENTS

| | | | |
|---|---|---|---|
| 5,021,775 A | 6/1991 | Babin | |
| 5,963,200 A * | 10/1999 | Deering | G06F 3/1446 345/213 |
| 6,122,000 A | 9/2000 | Yee et al. | |
| 6,754,234 B1 * | 6/2004 | Wiesner | H04N 5/126 348/E5.021 |
| 7,161,570 B2 | 1/2007 | Waterman | |
| 8,384,707 B2 | 2/2013 | Kennedy et al. | |
| 8,704,732 B2 | 4/2014 | Pourbigharaz et al. | |
| 9,837,044 B2 | 12/2017 | Kim | |
| 10,043,459 B1 * | 8/2018 | de Greef | G09G 3/348 |
| 10,431,149 B2 * | 10/2019 | Hyeon | H01L 27/3293 |
| 10,522,081 B2 * | 12/2019 | Kim | G09G 3/3233 |
| 2002/0030635 A1 | 3/2002 | Mcgowan | |

(Continued)

FOREIGN PATENT DOCUMENTS

WO    2014168836 A1    10/2014

OTHER PUBLICATIONS

"International Search Report and Written Opinion Issued in PCT Application No. PCT/US2019/064090", dated Feb. 10, 2020, 13 Pages.

*Primary Examiner* — Ricardo Osorio
(74) *Attorney, Agent, or Firm* — Fiala & Weaver P.L.L.C.

(57) ABSTRACT

Systems, apparatuses, and methods are described herein for phase locked multi-display synchronization. In a slave display device, a first tearing effect signal is received that indicates rendering of a first image frame portion of a first image frame by a master display device has at least been initiated. In response to receiving the first tearing effect signal, a second image frame portion of a first image frame is retrieved from a frame buffer and is rendered to a display screen of a slave display device. In response to rendering the retrieved second image frame portion, a second tearing effect signal is generated for receipt by a host device to trigger the host device to transmit a second image frame portion of a second image frame to the slave display device.

20 Claims, 5 Drawing Sheets

(56) References Cited

U.S. PATENT DOCUMENTS

| | | | |
|---|---|---|---|
| 2014/0028692 A1* | 1/2014 | Kim | G09G 5/003 |
| | | | 345/545 |
| 2014/0118377 A1* | 5/2014 | Bae | G09G 5/005 |
| | | | 345/545 |
| 2014/0307168 A1 | 10/2014 | Law et al. | |
| 2015/0339967 A1* | 11/2015 | Shin | G06F 3/1446 |
| | | | 345/690 |
| 2016/0239249 A1 | 8/2016 | Lee et al. | |
| 2017/0075092 A1* | 3/2017 | Kim | G02B 13/06 |

* cited by examiner

302
Receive a first tearing effect signal that indicates rendering of a first image frame portion of a first image frame by a master display device has at least been initiated 304
Retrieve, in response to said receiving the first tearing effect signal, a second image frame portion of a first image frame from a frame buffer 306
Render the retrieved second image frame portion to a display screen of the slave display device 308
Generate, in response to the rendering of the retrieved second image frame portion, a second tearing effect signal for receipt by a host device to trigger the host device to transmit a second image frame portion of a second image frame to the slave display device

502
Disable a functionality of the external trigger pin to enable the slave display device to operate independently of the master display device

PHASE LOCKED MULTI-DISPLAY SYNCHRONIZATION

BACKGROUND

Media systems, such as computing devices, having multiple display devices (also referred to as "displays") are becoming increasing popular. A problem that often comes with the presence of multiple displays is a lack of synchronization between the displays. For example, a dual-display system may be playing back a movie using a left-side display and a right-side display. To enable the movie video to be played using the two displays, the graphics layers of the system may split each movie image into two image frame portions (left-side portion and right-side portion), and send those two image frame portions to the two displays individually. However, if the two displays are not synchronized, the two image frame portions will be displayed out of sync, causing an unwanted tearing effect. According to the tearing effect, a left-side image frame portion of a current image frame may be presented on the left-side display while a right-side image frame portion of a previous image frame is presented on the right-side display. This lack of synchronization of image frame portions between the two displays leads to an unpleasant user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, apparatuses, and methods are described herein for phase locked multi-display synchronization. In a first aspect in a slave display device, a first tearing effect signal is received that indicates rendering of a first image frame portion of a first image frame by a master display device has at least been initiated. In response to receiving the first tearing effect signal, a second image frame portion of a first image frame is retrieved from a frame buffer and is rendered to a display screen of a slave display device. In response to rendering the retrieved second image frame portion, a second tearing effect signal is generated for receipt by a host device to trigger the host device to transmit a second image frame portion of a second image frame to the slave display device.

In another aspect, a slave display device includes an external trigger pin for receiving a first tearing effect signal that indicates rendering of a first image frame portion of a first image frame by a master display device has at least been initiated. The slave display device further includes a tearing signal output port, a frame buffer that stores a second image frame portion of the first image frame, a frame renderer, and a tearing effect signal generator. The frame renderer may be triggered by the first tearing effect signal to retrieve the second image frame portion of the first image frame from the frame buffer and render the retrieved second image frame portion to a display screen of the slave display device. The tearing effect signal generator is configured to generate a second tearing effect signal in response to the rendering of the retrieved second image frame portion to be output from the tearing signal output port for receipt by a host device. The second tearing effect signal is configured to trigger the host device to transmit a second image frame portion of a second image frame to the slave display device.

In another aspect, a master display device has a frame buffer that stores a first image frame portion of a first image frame received from a host device. The master display device includes a frame renderer configured to retrieve the first image frame portion of the first image frame from the frame buffer and render the retrieved first image frame portion to a display screen of the master display device. The master display device also includes a tearing signal output port. A tearing effect signal generator is further included in the master display device to generate a first tearing effect signal in response to the rendering of the first image frame portion of the first image frame. The first tearing effect signal is output from the tearing signal output for receipt by at least one of a slave display device to trigger the slave display device to render a second image frame portion of the first image frame to a display screen of the slave display device. The slave device is configured to generate a second tearing effect signal in response to rendering of the second image frame portion of the first image frame for receipt by the host device to trigger the host device to transmit a second image frame portion of a second image frame to the slave display device. The host device may also receive the first tearing effect signal to trigger the host device to transmit a first image frame portion of the second image frame to the master display device.

In still another aspect, the host device may include a multiplexer that receives a plurality of tearing effect signals from a respective plurality of display devices. The host device further includes an image frame sequencer that transmits image frames of an image stream to the display devices. For each image frame, the image frame sequence partitions the image frame into a plurality of image frame portions. For each image frame portion, the image frame sequencer transmits the image frame portion to a corresponding display device of the plurality of display devices in response to receipt of a tearing effect signal from the corresponding display device.

Further features and advantages of various embodiments, as well as the structure and operation of the various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Frequently, a media system, such a desktop computer system, may include multiple physically-separate display devices that each display a portion of each image frame of a video stream. For example, in a dual-display system, a desktop computer may be coupled to a left-side display and a right-side display. The computer may split each image frame of a video stream into a left-side image frame portion and a right-side image frame portion, and may supply the left-side image frame portion to the left-side display and the right-side image frame portion to the right-side display for simultaneous display. In this manner, a human viewer is displayed an effectively larger sized version of the image frame relative having the entire image frame being displayed on a single one of the displays. However, if the computer displays the image frame portions of an image frame on multiple displays in an unsynchronized manner, the viewer may suffer a less than satisfying experience.

Such lack of image synchronization between displays in a multi-display device system may be caused by a multitude of things, including different latencies between internal buffers of the displays or different oscillator frequencies of the displays. For instance, each display may have its own oscillator that drives data transfer from an internal frame buffer of the display to the panel or display screen of the display to render an image frame. These oscillators are not naturally synchronized between the displays, and thus operate at different frequencies. Therefore, one display can refresh from its frame buffer at a faster rate than another display. The mismatch in refresh rates may cause a tearing effect that results in image frame portions from different image frames being shown on the different display screens rather than image frame portions of a same image frame. The tearing effect can also occur when there is an overlap between the writing of data to the frame buffer of the display and the reading of data from that buffer. For example, if a host device writes an image frame portion to the internal buffer of the display while the display is trying to read from its internal buffer to render the image frame portion to its display screen, the viewer may see frame tearing on the different display screens. With a system having multiple displays, frame tearing may result in a current image frame being rendered on one display screen and a previous image frame being rendered on another display screen, and therefore the displays are considered out of sync.

In a multi-display system, a host device (e.g., a computer) or a host engine (e.g., of a computer) may be present to transmit image frames to the display devices. The host device may partition a particular image into a plurality of image frame portions and deliver each frame portion to the corresponding display device. The host device may be able to employ any technique to forcefully synchronize the display devices in an active manner. However, such an active management scheme by the host device is undesirable because it burdens the time and resources of the host device. Thus, while the host device is occupied with higher priority tasks, for example, delivery of images to the displays, the task of display synchronization may be delayed or insufficiently performed by the host device. When the host device misses display synchronization processing, the user may experience the tearing effect on the displays.

Example embodiments described herein are directed to techniques that enable phase locked display synchronization. These synchronization techniques are performed passively by the displays themselves and therefore do not require computational power of the host device.

A display device may be referred to as a "command mode display" when it has its own frame buffer, from which an image frame may be retrieved and rendered to its display screen. A display device may be referred to as a "video mode display" when it does not have its own frame buffer and relies on the host device to render an image frame directly to the display screen. Embodiments herein are directed primarily to command mode displays, although video mode displays may also be configured as described herein.

A command mode display, also known as a "smart panel," may have a vertical synchronization signal that is sent to the host device for single buffer update synchronization to prevent tearing effects (TE). Thus, such a synchronization signal may also be referred to as a tearing effect signal. The host device uses the tearing effect signals from the displays coupled to it to generate a system vertical synchronization (Vsync) signal for the graphics and display subsystem to synchronize graphics rendering and display updates. To achieve passive synchronized display updates according to embodiments, the tearing effect signals may be phase locked, such that the displays are effectively synchronized to the host device. In other words, when the tearing effect signals are phase locked, they are aligned even if their phases are not the same (may have a phase offset). The alignment of the tearing effect signals matters to the host device and any difference in phases are disregarded when determining whether the displays are synchronized.

Passive phase locked synchronization for a dual-display system with one display being a master display device and the other display being a slave display device may be performed according to the following steps, in an embodiment. A first tearing effect signal is generated and routed from the master display device to an external trigger pin of the slave display device, which triggers panel scanning at the slave display device. Panel scanning refers to the reading of an image frame from the frame buffer and rendering it to the display screen or panel. After the panel scanning, the slave display device generates a second tearing effect signal. This process is repeated, such that over time, the first tearing effect signal and the second tearing effect signal are phase locked (e.g., at a 360 degree offset). From the perspective of the host device, the master display device appears to be synchronized with the slave display device(s), and thus the host can initiate screen updates synchronously without having to expend computational power to actively synchronize the master and slave display device(s).

In this passive phase locked synchronization scheme, if the slave display device becomes inactive (e.g., is turned off), no change is needed for the master display device. If the master display becomes inactive (e.g., is removed from the system), the external trigger pin on the slave display device may be inactive and/or disabled so that the slave display device may operate by itself as a command mode display, independent of the master display device.

Accordingly, in the passive synchronization scheme, the burden on the host device is alleviated, with improvements to the performance of the host device because the host device can focus on other tasks and can be more efficient in performing its tasks. In performing the passive display synchronization, performance of the display devices is improved as well because the display devices do not have to rely on the host device to dedicate time and resources for the synchronization and can instead operate independently. Moreover, the passive synchronization technique described herein has the advantage of being low cost because no special accommodation is needed from the host device and only the addition of an external trigger pin is provided on each of the display devices. This scheme is also scalable because it may be applied to any number of displays in a multi-display system. This scheme is robust as each slave display device simply synchronizes to the master display device, thus system-level glitches such as frame drop and interrupt service routine latency do not affect synchronization. This scheme may also be easily managed by the host device or some other entity.

Figure 1:
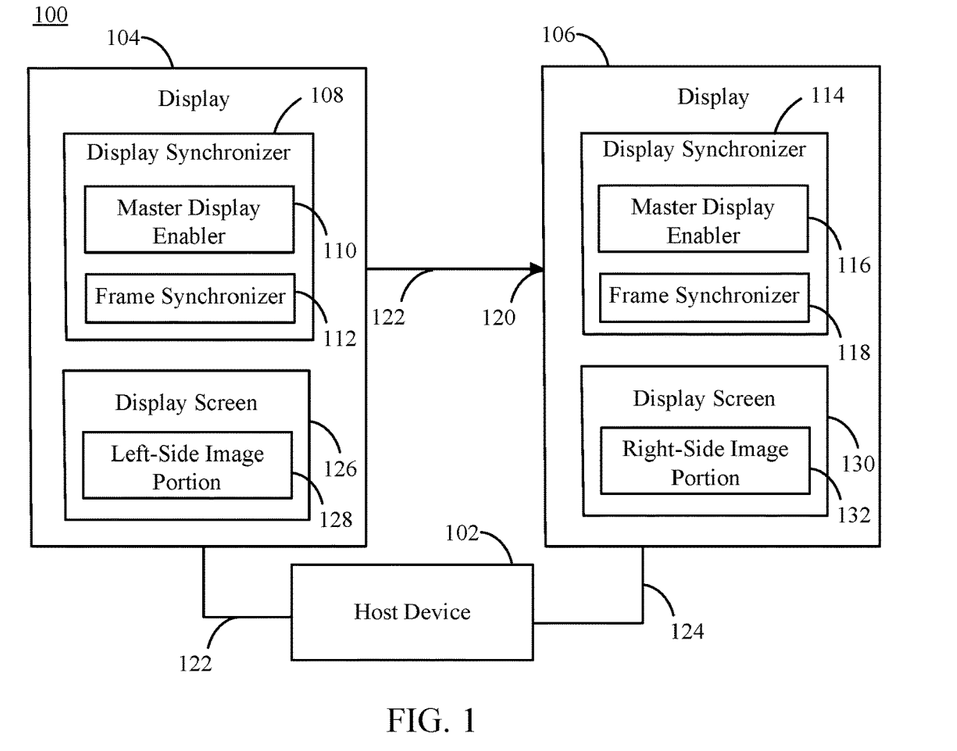
FIG. 1 is a block diagram of an example multi-display system for phase locked synchronization, according to an example embodiment.

Embodiments may enable passive display synchronization in various ways. For example, FIG. 1 shows a block diagram of an example multi-display system 100 for display synchronization, according to an example embodiment. Other structural and operational embodiments will be apparent to persons killed in the relevant art(s) based on the following discussion regarding multi-display system 100.

Multi-display system 100 includes a host device 102, a first display 104, and a second display 106. While first display 104 and second display 106 may be different or the same structurally with the same configurations, for purposes of explaining multi-display system 100, first display 104 is designated as a master display device and second display 106 is designated as a slave display device. It is noted that in other embodiments, second display 106 may be the master display device, and first display device 104 the slave display device. First display 104 and second display 106 may be communicatively coupled to host device 102 directly or via a network. As shown in FIG. 1, first display 104 includes a display synchronizer 108, which includes a master display enabler 110 and a frame synchronizer 112. Second display 106 includes a display synchronizer 114, which includes a master display enabler 116 and a frame synchronizer 118. System 100 is described in further detail as follows.

Host device 102 may include one or more server devices and/or other computing devices. Host device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), a stationary computing device such as a desktop computer or PC (personal computer), a television, etc.

Host device 102, first display 104 and second display 106 may each include at least one wired or wireless network interface that enables communication with each other and any other device directly or via network. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 106 include a local area network (LAN), a wide area network (WAN), a personal area network (PAN), and/or a combination of communication networks, such as the Internet.

Host device 102 may provide one or more applications to end users, such as a video or video streaming service. Examples of such services include but are by no means limited to a web-accessible SQL (structured query language) database, Facebook®, YouTube®, etc. In an embodiment, host device 102 provides a video stream to first display 104 and second display 106. First display 104 and second display 106 are configured to receive the video stream one image frame at a time. In particular, host device 102 may first partition an image frame into multiple image frame portions, such as a left-side image portion 128 and a right-side image portion 132. In such a two-image frame portion embodiment, first display 104 may configured to be a left-side display, and second display 106 may be configured to be a right-side display. Host device 102 transmits left-side image portion 128 of the image frame to first display 104, and right-side image portion 132 of the image frame to second display 106 such that the image frame portions are directed to the corresponding displays.

First display 104 and second display 106 store their respective image frame portions in their respective internal frame buffers. First display 104, being designated as the master display by host device 102 (e.g., as set by a display configuration setting of host device 102), retrieves left-side image portion 128 of the image frame from its frame buffer and renders it to a display screen 126 (e.g., an LCD (liquid crystal display) screen, an LED (light emitting diode) screen, a plasma screen, a CRT (cathode ray tube) monitor screen, etc.) of first display 104. First display 104 is configured to generate a first tearing effect signal 122 when left-side image portion 128 of the image frame is rendered. First display 104 is further configured to transmit first tearing effect signal 122 from a tearing effect signal output port to host device 102 to indicate that left-side image portion 128 of the image frame is being or has been rendered. First display 104 is also configured to transmit first tearing effect signal 122 to an external trigger pin 120 of second display 106. Upon receipt of first tearing effect signal 122 from first display 104, second display 106 is configured to retrieve right-side image portion 132 of the image frame from its frame buffer and render it to a display screen 130 of second display 106. Second display 106 is configured to generate its own second tearing effect signal 124, when right-side image portion 132 of the image frame is rendered. Second display 106 then transmits second tearing effect signal 124 to host device 102 to indicate that right-side image portion 132 of the image frame has been rendered. Upon receipt of a tearing effect signal, host device 102 is configured to transmit the next image frame, or a portion thereof, to the display from which the tearing effect signal was received without having to actively synchronize the displays. This is because to host device 102, the multiple displays appear to be synchronized because their tearing effect signals are aligned.

Note that although FIG. 1 shows first display 104, second display 106 and host device 102, as separate components, in another embodiment, such components may be incorporated together into one or more other components. Furthermore, note that although two displays are shown in FIG. 1 and described above, any number of additional displays may be present that are coupled to host device 102 and are configured as slave display devices similar to second display 106. The additional display devices receive a corresponding portion of the current image frame from host device 102, receive the first tearing effect signal 122 from first display 104, render their respective image frame portion, and transmit their own tearing effect signal to host device 102 to indicate that their portion of the image frame has been rendered. In this manner, all present display devices are effectively synchronized for display of image frames.

Figure 2:
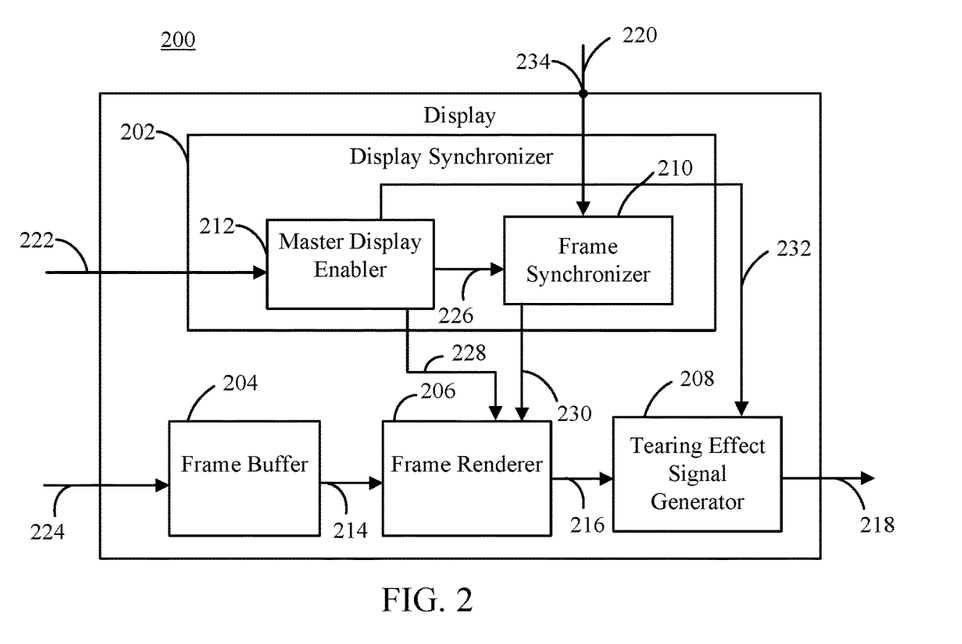
FIG. 2 is a block diagram of a display device for performing passive display synchronization, according to an example embodiment.

First display 104 and second display 106 shown in FIG. 1 may be configured in various ways to perform their functions. For instance, FIG. 2 shows a block diagram of a display 200, according to an example embodiment. FIG. 2 is described with continued reference to FIG. 1. Display 200 may be implemented as either first display 104 or second display 106 (or subsequent display), although display 200 may function differently depending on whether it is configured as a master display device or a slave display device. As shown in FIG. 2, display 200 includes a display synchronizer 202, which is configured to enable display 200 to perform passive synchronization between display 200 and other displays in a multi-display system, such as multi-display system 100 shown in FIG. 1. Display synchronizer 202 includes a master display enabler 212 and a frame synchronizer 210. Display 200 may further include a frame buffer 204, a frame renderer 206, and a tearing effect signal generator 208. The features of display 200 are described in further detail as follows.

A. Master Display Device Configuration

In an embodiment, display 200 may be configured as a master display device, such as first display 104 shown in FIG. 1. In this embodiment, as shown in FIG. 2, display synchronizer 202, specifically master display enabler 212, is configured to receive a mode signal 222 designating display 200 as a master display device. Mode signal 222 may be received from a host engine, for example, host device 102 as shown in FIG. 1. Mode signal 222 may also be received from another device that is configured to gather data from all the displays within the multi-display system and determine which display should be designated as a master display device. Regardless of where mode signal 222 originates, the determination of whether a display is a master display device may be made based on any technique, for example, by a predefined algorithm or configuration, a sequential or ranking order of the displays, random designation. For example, in a multi-display system, only one display may receive mode signal 222 designating it as the master display device whereas no other display device may receive mode signal 222. In another example, all displays may receive a respective mode signal 222 specifically indicating whether a particular display is a master display device or a slave display device. A master display device may be operating in master or primary mode, and a slave display device may be operating in slave or secondary mode. Other ways of designating or configuring a master display device may also be used.

As shown in FIG. 2, master display enabler 212 receives mode signal 222. In the above embodiment, mode signal 222 indicates display 200 as a master display device. Thus, master display enabler 212 is configured to transmit a control signal 226 to frame synchronizer 210 to disable frame synchronizer 210 and/or external trigger pin 234. Master display enabler 212 is also configured to transmit a control signal 228 to frame renderer 206 to indicate that frame renderer 206 should render image frames as soon as available in frame buffer 204. Master display enabler 212 is further configured to transmit a tearing effect control signal 232 to tearing effect signal generator 208 to indicate whether a tearing effect signal should be transmitted to a slave display device in addition to the tearing effect signal being transmitted to a host device. Control signal 226, control signal 228, and tearing effect control signal 232 may be the same signal or different signals and may be configured in various ways by master display enabler 212. For example, control signal 226, control signal 228, and tearing effect control signal 232 may be digital signals with a logical high for master mode and logical low for slave mode or vice versa. In another example, master display enabler 212 may also choose not to transmit any of control signal 226, control signal 228, or tearing effect control signal 232 to frame renderer 206 or tearing effect signal generator 208 for one mode (e.g., slave mode), and instead may transmit any of control signal 226, control signal 228, or tearing effect control signal 232 for another mode (e.g., master mode). For instance, master display enabler 212 may determine that no transmission of the tearing effect signal to the slave display device is needed (e.g., when display 200 is configured to be a slave display device) and may not transmit tearing effect control signal 232 to tearing effect signal generator 208.

Frame synchronizer 210 is configured to receive control signal 226 from master display enabler 212. When control signal 226 indicates that display 200 is a master display device, frame synchronizer 210 is configured to disable external trigger pin 234 or otherwise ignore any signal from external trigger pin 234 such as a tearing effect signal 220 configured to trigger a panel refresh or panel scan. A panel refresh or a panel scan is an operation in which frame renderer 206 retrieves image data from frame buffer 204 and renders it on a display screen/panel of display 200. In doing so, display 200, acting as a master display device, is not influenced by an external tearing effect signal for synchronization purposes. Frame synchronizer 210 is configured to determine whether to transmit a trigger signal 230 to frame renderer 206. For example, when display 200 is a master display device, frame synchronizer 210 may be configured to not transmit trigger signal 230 to frame renderer 206. Trigger signal 230 includes information from tearing effect signal 220 to trigger frame renderer 206 to render an image frame, or a portion thereof, from frame buffer 204. Alternatively, trigger signal 230 may be transmitted to frame renderer 206, but in master mode, trigger signal 230 may just indicate that there is no external trigger information, or may be ignored by frame renderer 206.

Frame buffer 204 is configured to receive a data signal 224 from a host device, such as host device 102 in FIG. 1, or any other data engine or computing device. Data signal 224 may be any data for display on display 200, for example, still and moving image frames in a video. In particular, data signal 224 may include an image frame or a portion thereof if the current image frame has been partitioned/split by the host device. For example, if display 200 is configured to be a left-side display of a dual-display system, display 200 may receive a left-side portion of an image frame for display. In another example, if display 200 is configured to be a first of more than two displays, then it may receive a first portion of an image frame (partitioned into a number of frame portions equal to the number of displays) for display. Frame buffer 204 is a memory storage device (e.g., random-access memory) that can store one or more image frames of data. Frame buffer 204 is configured to store data of data signal 224 and transmit the data to frame renderer 206 as a data signal 214, which may include the current image frame or the portion thereof.

Frame renderer 206 is configured to receive data signal 214 from frame buffer 204. Frame renderer 206 may also receive control signal 228 from master display enabler 212 and/or trigger signal 230 from frame synchronizer 210. In this embodiment of display 200 being a master display device, frame renderer 206 may receive control signal 228 from master display enabler 212 indicating that frame renderer 206 should render image frames as soon as available in frame buffer 204. In other words, frame renderer 206 is to proceed as normal as there is no need for display 200 to synchronize to, or wait for another display. Frame renderer 206 is configured to receive trigger signal 230 from frame synchronizer 210 and abide by any external trigger information that trigger signal 230 provides. If no trigger signal 230 is received, then frame renderer 206 may operate normally. That is, frame renderer 206 may proceed to render image frames as soon as available from frame buffer 204. Frame renderer 206 is configured to render the image data (e.g., an image frame portion) of data signal 214 to a display screen or panel of display 200. When frame renderer 206 is finished rendering or has at least initiated the process of rendering the data of data signal 214, frame renderer 206 may transmit render signal 216 to tearing effect signal generator 208. Render signal 216 indicates that frame renderer 206 has at least initiated or finished rendering data signal 214. When render signal 216 is transmitted to tearing effect signal generator 208 may be a predefined and/or configurable parameter.

Tearing effect signal generator 208 is configured to receive render signal 216 from frame renderer 206. Tearing effect signal generator 208 is configured to generate a tearing effect (TE) signal 218 that may be a pulse wave or any other waveform to indicate that data signal 214 has been rendered fully or partially to the display screen of display 200. Tearing effect signal 218 may be generated as soon as render signal 216 is received or at any other time as predefined by the manufacturer of display 200 or configured by some entity. For example, tearing effect signal generator 208 may generate tearing effect signal 218 when a certain percentage of the image data of data signal 214 has been rendered or when a specific line number of the image frame has been rendered. Tearing effect signal generator 208 is configured to transmit tearing effect signal 218 via a tearing effect signal output port to a host device, such as host device 102 shown in FIG. 1, or any other entity that transmitted data signal 224 to display 200. Tearing effect signal 218 has the effect of synchronizing display 200 to the host device, as it prevents the host device from performing an image content update (transmitting a next image frame portion) to display 200 until tearing effect signal 218 is received. In other words, the receipt of tearing effect signal 218 informs the host device that it is now permissible to write data to display 200. Upon receipt of tearing effect signal 218, the host device is configured to transmit another image frame or a portion thereof to display 200 without having to determine whether display 200 is synchronized with any other display. This is because the host device is configured to receive tearing effect signals from all the displays communicatively coupled with it, and the displays will appear to be synchronized to each other based on their tearing effect signals being aligned.

Tearing effect signal generator 208 is further configured to receive tearing effect control signal 232 that indicates whether tearing effect signal 218 should be transmitted to a slave display device, such as display device 106 in FIG. 1, in addition to the tearing effect signal being transmitted to the host device. In master mode, tearing effect signal generator 208 may receive tearing effect control signal 232 indicating that tearing effect signal 218 should be transmitted to one or more slave display devices. Accordingly, tearing effect signal generator 208 may transmit tearing effect signal 218 via the tearing effect signal output port to one or more slave display devices communicatively coupled to display 200. Upon receipt of tearing effect signal 218 from display 200, the one or more slave display devices are configured to render the content (e.g., an image frame or a portion thereof) stored in their respective frame buffers to their own display screens. In an embodiment tearing effect signal 218 may be transmitted from tearing effect signal generator 208 to the host device and the slave device(s) simultaneously.

B. Slave Display Device Configuration

In another embodiment, display 200 may be configured as a slave display device, such as second display 106 shown in FIG. 1. In this embodiment, as shown in FIG. 2, display synchronizer 202, specifically master display enabler 212, is configured to receive a mode signal 222 designating display 200 as a slave display device. As described above, mode signal 222 may be received from a host engine, for example, host device 102 as shown in FIG. 1. Mode signal 222 may also be received from another device that is configured to gather data from all the displays within the multi-display system and determine which display should be designated as a slave display device. Regardless of where mode signal 222 originates, the determination of whether a display should be a slave display device may be made based on any method, for example, by a predefined algorithm or configuration, a sequential or ranking order of the displays, random designation. For example, in a multi-display system, only one display may receive mode signal 222 designating it as the master display device whereas no other display device may receive mode signal 222. Thus, the display devices that do not receive mode signal 222 are considered slave display devices. In another example, all displays within a system may receive a respective mode signal 222 specifically indicating whether a particular display is a master display device or a slave display device. A master display device may be operating in master or primary mode, and a slave display device may be operating in slave or secondary mode. Other ways of designating or configuring a slave display device may also be used.

In this embodiment, mode signal 222 indicates display 200 as a slave display device. Thus, master display enabler 212 transmits control signal 226 to frame synchronizer 210 to enable frame synchronizer 210 and/or external trigger pin 234. Master display enabler 212 is also configured to transmit control signal 228 to frame renderer 206 to indicate that frame renderer 206 should not render image frames as soon as available in frame buffer 204, and instead wait for trigger signal 230 from frame synchronizer 210. Master display enabler 212 is further configured to transmit tearing effect control signal 232 to tearing effect signal generator 208 to indicate whether a tearing effect signal should be transmitted to a slave display device in addition to the tearing effect signal being transmitted to a host device. Control signal 226, control signal 228, and tearing effect control signal 232 may be the same or different signal, and may be configured in various ways. For example, control signal 226, control signal 228, and tearing effect control signal 232 may be digital signals with a logical high for master mode and logical low for slave mode or vice versa. In another example, master display enabler 212 may be configured to not transmit any of control signal 226, control signal 228, or tearing effect control signal 232 to frame renderer 206 or tearing effect signal generator 208 for one mode (e.g., slave mode), and may be configured to transmit any of control signal 226, control signal 228, or tearing effect control signal 232 for another mode (e.g., master mode).

Frame synchronizer 210 is configured to receive control signal 226 from master display enabler 212. When control signal 226 indicates that display 200 is a slave display device, frame synchronizer is configured to enable external trigger pin 234 or otherwise receive any signal from external trigger pin 234 such as a tearing effect signal 220 configured to trigger a panel refresh or panel scan. Tearing effect signal 220 is received from a master display device, for example, first display 104 as shown in FIG. 1. A panel refresh or a panel scan is an operation in which frame renderer 206 retrieves image data from frame buffer 204 and renders it on a display screen or panel of display 200. In doing so, display 200, operating in slave mode, is influenced by an external tearing effect signal to perform passive synchronization between display 200 and other displays communicatively coupled to display 200. Frame synchronizer 210 is configured to determine whether to transmit trigger signal 230 to frame renderer 206. For example, in slave mode, frame synchronizer 210 may be configured to transmit trigger signal 230 to frame renderer 206. Trigger signal 230 includes information from tearing effect signal 220 to trigger frame renderer 206 to render an image frame, or a portion thereof, from frame buffer 204.

Frame buffer 204 is configured to receive data signal 224 from a host device, such as host device 102 in FIG. 1, or any other data engine or computing device. As described above, data signal 224 may include any image data for display on display 200, for example, still and moving images in a video. Data signal 224 may include an image frame or a portion thereof if the frame has been partitioned by the host device. For example, if display 200 is configured to be a right-side display of a dual-display system, display 200 may receive a right-side portion of an image frame for display. As another example, if display 200 is configured to be a second of multiple displays, then it may receive a second portion of an image frame for display. Frame buffer 204 may include one or more memory storage devices (e.g., random-access memory) that can store one or more frames of image data (e.g., an array of pixel data). Frame buffer 204 is configured to store image data of data signal 224 and transmit the image data to frame renderer 206 in data signal 214, which includes the image frame or portion thereof.

Frame renderer 206 is configured to receive data signal 214 from frame buffer 204. Frame renderer 206 may also receive control signal 228 from master display enabler 212 and/or trigger signal 230 from frame synchronizer 210, depending on how master display enabler 212 is configured to indicate either master mode or slave mode to the other components of display 200 as mentioned above in reference to the master display device configuration embodiment. In the embodiment of display 200 being a slave display device, frame renderer 206 may receive control signal 228 from master display enabler 212 indicating that frame renderer 206 should render image frames when triggered by trigger signal 230 from frame synchronizer 210. In other words, frame renderer 206 may operate based on trigger signal 230 in order to synchronize to a master display device. Frame renderer 206 is configured to render image data of data signal 214 to a display screen or panel of display 200 based on any external trigger information that trigger signal 230 provides. Such external trigger information may be timing information, for example. When frame renderer 206 is finished rendering or has at least initiated the rendering of the image frame portion of data signal 214, frame renderer 206 may transmit render signal 216 to tearing effect signal generator 208. Render signal 216 indicates that frame renderer 206 has at least initiated or finished rendering data signal 214. A timing by which render signal 216 is transmitted to tearing effect signal generator 208 may be predefined and/or a configurable parameter.

Tearing effect signal generator 208 is configured to receive render signal 216 from frame renderer 206. Tearing effect signal generator 208 is configured to generate a tearing effect (TE) signal 218 that may be a pulse wave or any other waveform to indicate that data signal 214 has been rendered fully or partially to the display screen of display 200. Tearing effect signal 218 may be generated as soon as render signal 216 is received or at any other time as predefined by the manufacturer of display 200 or configured by some entity. For example, tearing effect signal generator 208 may generate tearing effect signal 218 when a predefined percentage of the image frame portion of data signal 214 has been rendered or when a specific line number of the image frame portion has been rendered. Tearing effect signal generator 208 is configured to transmit tearing effect signal 218 via a tearing signal output port to a host device, such as host device 102 shown in FIG. 1, or any other entity that transmitted data signal 224 to display 200. Tearing effect signal 218 has the effect of synchronizing display 200 to the host device, as it prevents the host device from performing a content update to display 200 until tearing effect signal 218 is received. In other words, the receipt of tearing effect signal 218 informs the host device that it is now permissible to write image data to display 200. Upon receipt of tearing effect signal 218, the host device is configured to transmit another image frame or a portion thereof to display 200 without having to determine whether display 200 is synchronized with any other display. This is because the host device is configured to receive tearing effect signals from all the displays communicatively coupled with it, and the displays will appear to be synchronized to each other based on their tearing effect signals being aligned.

Tearing effect signal generator 208 is further configured to receive tearing effect control signal 232 that indicates whether tearing effect signal 218 should be transmitted to a slave display device, such as display device 106 in FIG. 1, in addition to the tearing effect signal being transmitted to the host device. In slave mode, tearing effect signal generator 208 may receive tearing effect control signal 232 indicating that tearing effect signal 218 should not be transmitted to one or more slave display devices. Alternatively, if no tearing effect control signal 232 is received, tearing effect signal generator 208 may be configured to transmit tearing effect signal 218 only to the host device.

C. Method for Phase Locked Display Synchronization

Figure 3:
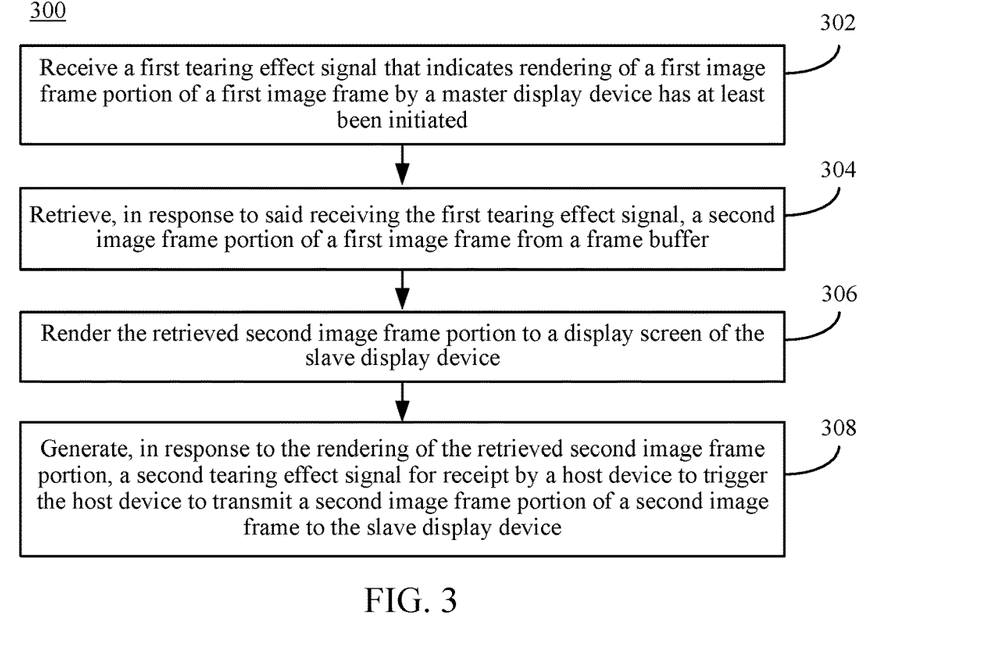
FIG. 3 depicts a flowchart of a method in a display device for phase locked display synchronization, according to an example embodiment.

In embodiments, multi-display system 100 may operate in various ways to facilitate phase locked display synchronization. For instance, FIG. 3 shows a flowchart 300 providing a method for phase locked display synchronization performed by a slave device, according to an example embodiment. Flowchart 300 is described with respect to multi-display system 100 for illustrative purposes. Note that the steps of flowchart 300 may be performed in an order different than shown in FIG. 3 in some embodiments. Furthermore, not all steps of flowchart 300 need to be performed in all embodiments. Further structural and operational embodiments will be apparent to persons skilled in the relevant art(s) based on the following description of flowchart 300 and multi-display system 100.

Flowchart 300 begins with step 302. In step 302, a first tearing effect signal is received that indicates rendering of a first image frame portion of a first image frame by a master display device has at least been initiated. For example, in an embodiment, second display 106 receives a first tearing effect signal 122 that indicates rendering of a first image frame portion of a first image frame by first display 104 has at least been initiated by first display 104. The first tearing effect signal may be received at an external trigger pin, such as external trigger pin 120 shown in FIG. 1. First display 104 may generate and transmit first tearing effect signal 122 in the manner described in the above master display device configuration embodiment.

In step 304, a second image frame portion of a first image frame from a frame buffer is retrieved in response to said receiving the first tearing effect signal. For example, in an embodiment, to perform passive synchronization to synchronize second display 106 to first display 104, second display 106, being configured as a slave display device, is configured to retrieve image data (e.g., an image frame or a portion thereof) from its internal frame buffer when it receives first tearing effect signal 122 from first display 104.

In step 306, the retrieved second image frame portion is rendered to a display screen of the slave display device. In an embodiment, first tearing effect signal 122 serves to trigger the rendering of image data in second display 106. Second display 106 may retrieve image data from its internal frame buffer and render image data in the manner described in the above slave display device configuration embodiment.

In step 308, in response to the rendering of the retrieved second image frame portion, a second tearing effect signal is generated for receipt by a host device to trigger the host device to transmit a second image frame portion of a second image frame to the slave display device. For example, in response to the rendering of image data (e.g., an image frame or a portion thereof), second display 106 may generate and transmit second tearing effect signal 124 to host device 102 to trigger host device 102 to transmit additional data (e.g., a next image frame or a portion thereof) to display device 106. The generation and transmission of second tearing effect signal 124 may be performed in the manner described in the above slave display device configuration embodiment.

Accordingly, host device 102 receives first tearing effect signal 122 from first display 104 and second tearing effect signal 124 from second display 106, and from the perspective of host device 102, first display 104 and second display 106 appear to be synchronized because first tearing effect signal 122 and second tearing effect signal 124 are aligned.

Figure 4:
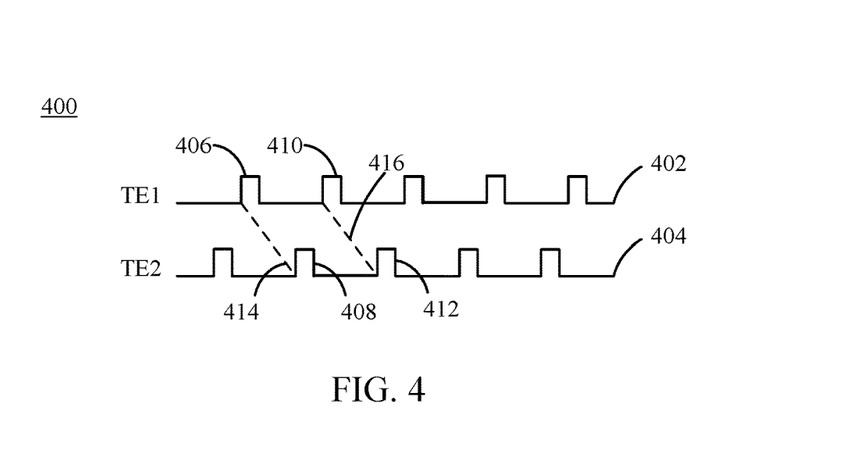
FIG. 4 shows an example timing diagram for phase locked display synchronization in a multi-display system, according to an embodiment.

For example, FIG. 4 shows an example timing diagram for phase locked synchronization, according to an example embodiment. FIG. 4 shows a first tearing effect signal 402 and a second tearing effect signal 404, which may respectively correspond to first tearing effect signal 122 and second tearing effect signal 124 shown in FIG. 1. Each of first tearing effect signal 402 and second tearing effect signal 404 is shown as a pulse waveform over time, although not shown to scale.

In an embodiment, first tearing effect signal 402 is from a master display device, for example, first display 104 of FIG. 1. Accordingly, first tearing effect signal 402 serves as a reference signal for passive synchronization. That is, a slave display device, such as second display 106 in FIG. 1, may use first tearing effect signal 402 to synchronize itself to the master display. First tearing effect signal 402 includes a first pulse 406, which goes high when the image content from the internal frame buffer of first display 104 is rendered (or rendering has been initiated) to the display screen. When pulse 406 goes high, first tearing effect signal 402 is transmitted to second display 106, to trigger the rendering of image content from the internal frame buffer of second display 106, as well as the generation and output of second tearing effect signal 404. In operation, second display 106 waits for first tearing effect signal 402 from first display 104, and only when second display 106 determines that it is in the correct phase, it will render its own image content, thereby synchronizing itself to first display 104, the master display device. Second tearing effect signal 404 has a first pulse 408, which indicates that the image content from the internal frame buffer of second display 106 has been rendered. As shown in FIG. 4, first pulse 408 of second tearing effect signal 404 follows first pulse 406 of first tearing effect signal 402 as shown by dotted line 414. Similarly, when first display 104 has at least initiated the rendering of its portion of the next image frame, second pulse 410 of first tearing effect signal 402 goes high, thereby triggering second display 106 to render its own portion of the next image frame and output second pulse 408 of second tearing effect signal 404. Again, second pulse 412 of second tearing effect signal 404 follows second pulse 410 of first tearing effect signal 402, as shown by dotted line 416, illustrating that second display 106 follows or synchronizes to first display 104.

In the above embodiment, second display 106 and first display 104 may appear to be synchronized after a synchronization period. The synchronization period may occur during initial power up of at least one of a master display device, a slave display device, or a host device. Thus, at the start of the synchronization period, the displays in a multi-display system may not be completely in sync. If the displays are totally out of sync at the beginning, it may be not immediately possible or may be inefficient to perform passive synchronization right away. In this case, rendering content to the display screen of second display 106 may result in flickers at the display screen. One solution may be for second display 106 to time out for some time until first tearing effect signal 122 and second tearing effect signal 124 are aligned well enough to begin passive synchronization. The time out period may be relatively short (e.g., a couple of frames) as to not result in flickering at the display screen. In an embodiment, across a few frames (e.g., 3 or 4 frames), second display 106 and first display 104 may appear to be more and more synchronized over time. In other words, over the synchronization period, second tearing effect signal 124 may experience a full range of phase shift to be 360 degrees phase shifted from tearing first tearing effect signal 122. The exact amount of time required for the synchronization period may depend on optical properties (e.g., liquid crystal material or leakage current of panel transistors) of first display 104 and second display 106. From then on, first tearing effect signal 122 and second tearing effect signal 124 may be 360 degrees phase locked. Any phase shift between first tearing effect signal 122 and second tearing effect signal 124 may be ignored by host device 102 as only the timing of first tearing effect signal 122 and second tearing effect signal 124 matters to host device 102 in determining that first display 104 and second display 106 are synchronized.

According to the above embodiment, second display 106 and first display 104 may be synchronized in a low cost, scalable, robust, and easily managed manner without placing the burden of display synchronization on the host device. All that is required is an external trigger pin on the displays to receive a tearing effect signal from the master display. However, there are times when the external trigger pin may be disabled, for example, when the display is configured as a master display or when the master display is removed from a multi-display system and the slave display needs to be able to operate independently of the master display.

Figure 5:
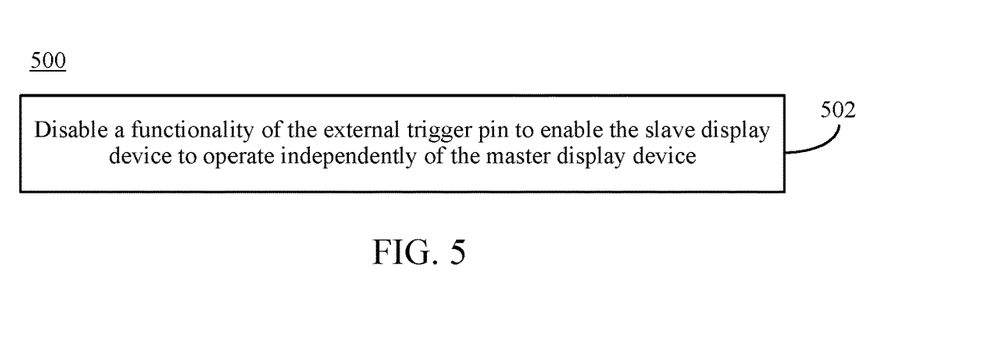
FIG. 5 depicts a flowchart of a method for disabling an external trigger pin on a display device, according to an embodiment.

Embodiments may disable an external trigger pin on a display. For example, and as will be discussed in more detail below in FIGS. 5 and 6. FIG. 5 depicts a flowchart 500 of a method for disabling an external trigger pin on a display device, according to an embodiment. Further structural and operational embodiments will be apparent to persons skilled in the relevant art(s) based on the following description of flowchart 500.

As shown in FIG. 5, flowchart 500 begins at step 502. In step 502, a functionality of the external trigger pin is disabled to enable the slave display device to operate independently of the master display device. For example, in the event that a master display device, such as first display 104 of FIG. 1, becomes inactive (e.g., is powered down or removed from the system), the external trigger pin 120 of second display 106 may be disabled so that second display 106 may operate as a typical command mode display without having to synchronize itself to another display device. In other words, the functionality of external trigger pin 120—the ability to trigger display of an image frame portion by second display 106 by received of an external trigger signal—is disabled. For the sake of brevity, the process for disabling the external trigger pin will not be described again as it has already been described in the master display device configuration embodiment above.

Figure 6:
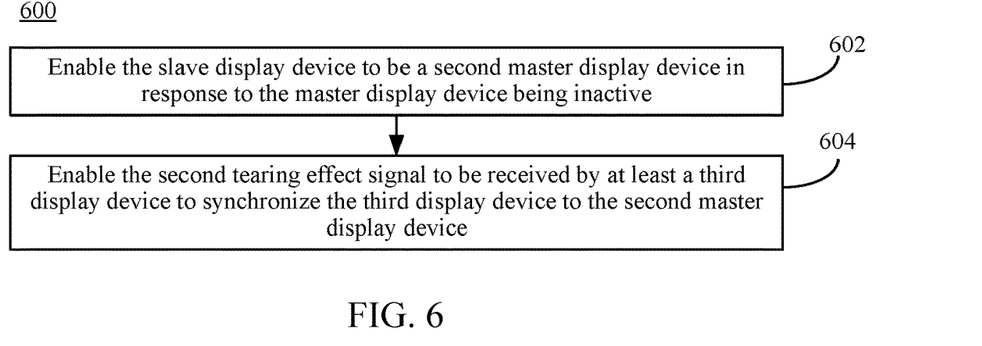
FIG. 6 depicts a flowchart of a method for enabling a slave display device to become a master display device, according to an embodiment.

Disabling the external trigger pin also enables a display device to be configured to be a master display device. FIG. 6 depicts a flowchart 600 of a method for enabling a slave display device to become a master display device, according to an embodiment. Further structural and operational embodiments will be apparent to persons skilled in the relevant art(s) based on the following description of flowchart 600.

As shown in FIG. 6, flowchart 600 begins at step 602. In step 602, the slave display device is enabled to be a second master display device in response to the master display device being inactive. For example, in the event that a master display device, such as first display 104 of FIG. 1, becomes inactive (e.g., is powered down or removed from the system), the external trigger pin 120 of second display 106 may be disabled so that second display 106 may be configured to be a new master device. In a system, such as multi-display system 100 of FIG. 1, host device 102 is aware of all the displays and their statuses (e.g., active or inactive). Thus, when a display is shut down or otherwise inactive, a host device may determine which if any slave devices could be the new master display and sends the appropriate mode signal in response to that determination. The host device may make such determination by a predefined algorithm or configuration, a sequential or ranking order of the displays, random designation, user selection (e.g., by a display configuration user interface available at host device 102), or by any other method. In multi-display system 100 of FIG. 1, when first display 104 becomes inactive, host device 102 may send a mode signal to second display 106 to indicate that second display 106 is the new master display device.

In step 604, the second tearing effect signal is enabled to be received by at least a third display device to synchronize the third display device to the second master display device. For example, in a system, such as multi-display system 100 of FIG. 1, when first display 104 becomes inactive and second display 106 is configured to be the new master display, second tearing effect signal 124 generated by second display 106 is configured to be transmitted to one or more display devices in the system. The one or more display devices may synchronize themselves to the new master display based on the received tearing effect signal as described in the slave display device configuration embodiment above.

Figure 7:
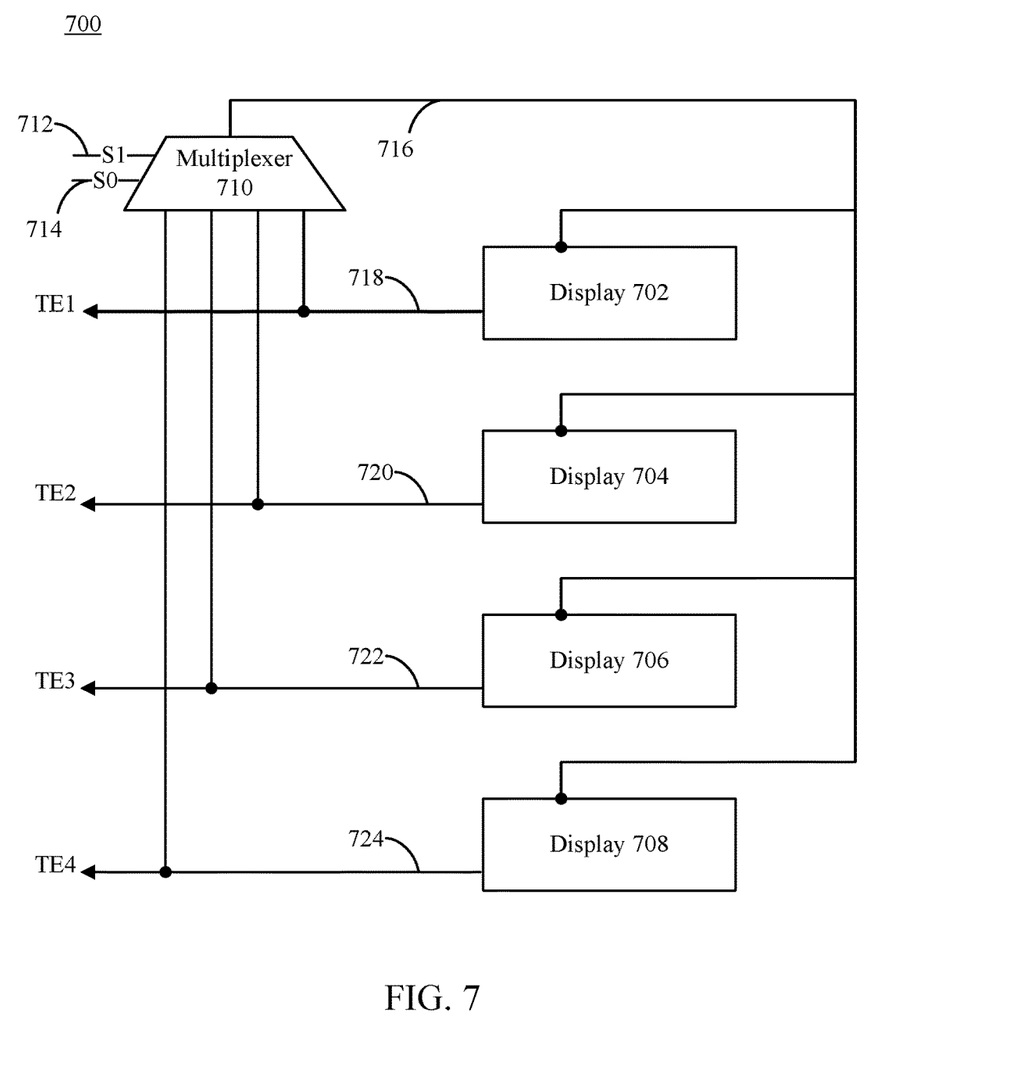
FIG. 7 shows a block diagram of another multi-display system for phase locked synchronization, according to an example embodiment.

It is noted that FIG. 1 shows multi-display system 100 with two displays. However, multi-display system 100 may be scalable such that more displays may be added. For example, FIG. 7 shows a block diagram of a multi-display system 700 for phase locked synchronization, according to an embodiment. Multi-display system 700 includes a display 702, a display 704, a display 706, and a display 708. Display 702 may output a first tearing effect signal 718, display 704 may output a second tearing effect signal 720, display 706 may output a third tearing effect signal 722, and display 708 may output a fourth tearing effect signal 724. Each of the tearing effect signals, 718, 720, 722, and 724, is transmitted to a host device, such as host device 102 in FIG. 1. Each of display 702, display 704, display 706, and display 708 may be capable of being configured to be a master display device, such as first display 104, or a slave display device, such as second display 106, shown in FIG. 1. Thus, display 702, display 704, display 706, and display 708 may function in a manner similar to first display 104 and second display 106, and this functionality is not described again for the sake of brevity.

Multi-display system 700 includes a multiplexer 710 communicatively coupled with display 702, display 704, display 706 and display 708. Tearing effect signal 718, tearing effect signal 720, tearing effect signal 722, and tearing effect signal 724 are transmitted to multiplexer 710. A master display device may be selected among display 702, display 704, display 706 and display 708 using selector pin 712 and selector pin 714 of multiplexer 710. The determination of whether a display should be a master display device may be made by the host device based on any method, for example, by a predefined algorithm or configuration, a sequential or ranking order of the displays, random designation. Once this determination is made, selector pin 712 and selector pin 714 may be used to select the appropriate display to be the master display device via signal 716. As such, the tearing effect signal of the selected master display device is provided to the slave display devices to trigger their rendering of their respective image frame portions, thereby synchronizing the slave display devices with the master display device. Note that multiplexer 710 may reside in the host device or an entity separate from the host device (e.g., in a display or elsewhere).

While four displays are shown in FIG. 7, more displays may be added by increasing the number of pins in multiplexer 710. Thus, it is a fairly simple process to add more displays to multi-display system 700 with very little increase in complexity.

Figure 8:
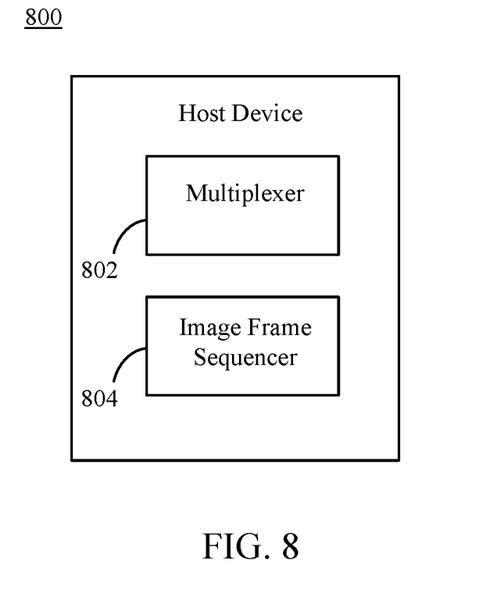
FIG. 8 shows a block diagram of a host device for a multi-display system that performs phase locked synchronization, according to an example embodiment.

As mentioned, multiplexer 710 may reside in any suitable device. FIG. 8 shows a block diagram of a host device for a multi-display system that performs phase locked synchronization. As shown in FIG. 8, host device 800 includes multiplexer 802 and image frame sequencer 804. In an embodiment, host device 800 may be implemented as host device 102 of FIG. 1, and multiplexer 802 may be implemented as multiplexer 710 of FIG. 7. For example, multiplexer 802 is configured to receive a plurality of tearing effect signals from a respective plurality of display devices, such as any display shown in FIG. 1 or FIG. 7. Image frame sequencer 804 is configured to transmit content, for example, image frames of an image stream to the plurality of display devices. For each image frame, image frame sequencer 804 is configured to partition the image frame into a plurality of image frame portions. For each image frame portion, image frame sequencer 804 is configured to transmit the image frame portion to a corresponding display device of the display device in response to receipt of a tearing effect signal from the corresponding display device.

In an embodiment, host device 800 may be aware of the status of each of the displays to which it is coupled. For example, when a display is turned off, there may be a signal that is implement in hardware, software, or both to alert host device 800 of the inactive status of that display. In another example, there may be constant or periodic feedback from the displays to the host device, and if the feedback for a particular display can no longer be detected, then the host device can conclude that particular display is inactive. If the display that becomes inactive is a slave display device, host device 100 may not continue to update content to the inactive display. If the display that becomes inactive is a master display device, host device 100 may reconfigure a new master display device from the remaining active display devices via multiplexer 802.

III. Example Computer System Implementation

Multi-display system 100, display 200, multi-display system 700, host device 800 and flowcharts 300, 500, and/or 600 may be implemented in hardware, or hardware combined with software and/or firmware. For example, display synchronizer 108, display synchronizer 114, display synchronizer 202, image frame sequencer 804, and flowcharts 300, 500, and/or 600 may be implemented as computer program code/instructions configured to be executed in one or more processors and stored in a computer readable storage medium. Alternatively, display synchronizer 108, display synchronizer 114, display synchronizer 202, image frame sequencer 804, and flowcharts 300, 500, and/or 600 may be implemented as hardware logic/electrical circuitry.

For instance, in an embodiment, one or more, in any combination, of display synchronizer 108, display synchronizer 114, display synchronizer 202, image frame sequencer 804, and/or any one or more of flowcharts 300, 500 and/or 600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
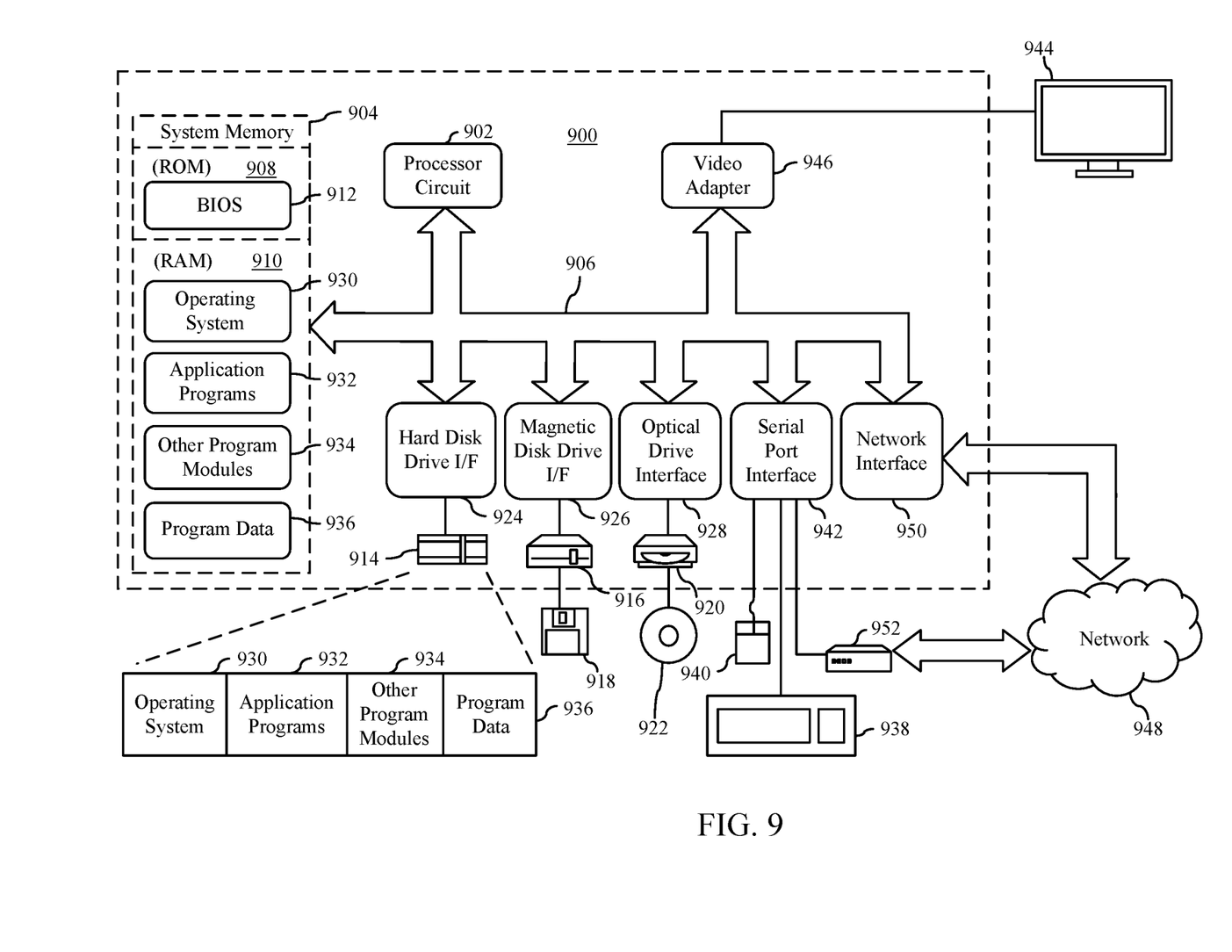
FIG. 9 is a block diagram of an example processor-based computer system that may be used to implement various embodiments.

FIG. 9 depicts an exemplary implementation of a computing device 900 in which embodiments may be implemented. For example, host device 102 and host device 800 may each be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing display synchronizer 108, display synchronizer 114, display synchronizer 202, image frame sequencer 804, and flowcharts 300, 500, and/or 600 (including any suitable step of flowcharts 300, 500 and/or 600), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A slave display device is described herein. The slave display device includes an external trigger pin configured to receive a first signal that indicates rendering of a first image frame portion of a first image frame by a master display device has at least been initiated; a signal output port; a frame buffer that stores a second image frame portion of the first image frame; a frame renderer configured to be triggered by the first signal to retrieve the second image frame portion of the first image frame from the frame buffer and render the retrieved second image frame portion to a display screen of the slave display device; and a signal generator configured to generate a second t signal in response to the rendering of the retrieved second image frame portion to be output from the output port for receipt by a host device to trigger the host device to transmit a second image frame portion of a second image frame to the slave display device.

In one embodiment of the foregoing slave display device, the first signal includes a first tearing effect signal and the second signal includes a second tearing effect signal.

In one embodiment of the foregoing slave display device, the first tearing effect signal is received from the master display device.

In one embodiment of the foregoing slave display device, the slave display device further includes a master display enabler configured to disable a functionality of the external trigger pin to enable the slave display device to operate independently of the master display device In one embodiment of the foregoing slave display device, the slave display device further includes a master display enabler configured to enable the slave display device to be a second master display device in response to the master display device being inactive.

In one embodiment of the foregoing slave display device, the signal generator is further configured to transmit the second signal to at least a third display device to synchronize the third display device to the second master display device.

In one embodiment of the foregoing slave display device, the second tearing effect signal is 360 degrees phase shifted from the first tearing effect signal after a synchronization period.

In one embodiment of the foregoing slave display device, the synchronization period occurs during initial power up of at least one of the slave display device or the master display device.

A method for phase locked display synchronization performed by a slave display device is described herein. The method includes receiving a first signal that indicates rendering of a first image frame portion of a first image frame by a master display device has at least been initiated; in response to said receiving the first signal, retrieving a second image frame portion of a first image frame from a frame buffer; rendering the retrieved second image frame portion to a display screen of the slave display device; and in response to the rendering of the retrieved second image frame portion, generating a second signal for receipt by a host device to trigger the host device to transmit a second image frame portion of a second image frame to the slave display device.

In one embodiment of the foregoing method, the first signal includes a first tearing effect signal and the second signal includes a second tearing effect signal.

In one embodiment of the foregoing method, the first tearing effect signal is received from the master display device.

In one embodiment of the foregoing method, the method further includes disabling a functionality of the external trigger pin to enable the slave display device to operate independently of the master display device.

In one embodiment of the foregoing method, the method further includes enabling the slave display device to be a second master display device in response to the master display device being inactive.

In one embodiment of the foregoing method, the method further includes enabling the second tearing effect signal to be received by at least a third display device to synchronize the third display device to the second master display device.

In one embodiment of the foregoing method, the second tearing effect signal is 360 degrees phase shifted from the first tearing effect signal after a synchronization period.

A master display device is described herein. The master display device includes a frame buffer that stores a first image frame portion of a first image frame received from a host device; a frame renderer configured to retrieve the first image frame portion of the first image frame from the frame buffer and render the retrieved first image frame portion to a display screen of the master display device; a signal output port; and a signal generator configured to generate a first signal in response to the rendering of the first image frame portion of the first image frame, the first signal output from the signal output port for receipt by at least one of a slave display device to trigger the slave display device to render a second image frame portion of the first image frame to a display screen of the slave display device, the slave display device configured to generate a second signal in response to rendering the second image frame portion of the first image frame for receipt by the host device to trigger the host device to transmit a second image frame portion of a second image frame to the slave display device, or the host device to trigger the host device to transmit a first image frame portion of the second image frame to the master display device.

In one embodiment of the foregoing master display device, the first signal includes a first tearing effect signal and the second signal includes a second tearing effect signal.

In one embodiment of the foregoing master display device, the master display device further includes an external trigger pin configured to receive a third tearing effect signal, the third tearing effect signal configured to trigger the frame renderer to render an image frame portion currently being stored in the frame buffer to the display screen of the master display device.

In one embodiment of the foregoing master display device, the second tearing effect signal is 360 degrees phase shifted from the first tearing effect signal after a synchronization period.

In one embodiment of the foregoing master display device, the synchronization period occurs during initial power up of at least one of the master display device or the slave display device.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A slave display device, comprising:
    an external trigger pin configured to receive a first signal that indicates rendering of a first image frame portion of a first image frame by a master display device has at least been initiated;
    a signal output port;
    a frame buffer that stores a second image frame portion of the first image frame;
    a frame renderer configured to be triggered by the first signal to retrieve the second image frame portion of the first image frame from the frame buffer and render the retrieved second image frame portion to a display screen of the slave display device; and
    a signal generator configured to generate a second signal in response to the rendering of the retrieved second image frame portion to be output from the signal output port for receipt by a host device to trigger the host device to transmit a second image frame portion of a second image frame to the slave display device.

2. The slave display device of claim 1, wherein the first signal comprises a first tearing effect signal and the second signal comprises a second tearing effect signal.

3. The slave display device of claim 2, wherein the first tearing effect signal is received from the master display device.

4. The slave display device of claim 2, wherein the second tearing effect signal is 360 degrees phase shifted from the first tearing effect signal after a synchronization period.

5. The slave display device of claim 4, wherein the synchronization period occurs during initial power up of at least one of the slave display device or the master display device.

6. The slave display device of claim 1, further comprising:
a master display enabler configured to disable a functionality of the external trigger pin to enable the slave display device to operate independently of the master display device.

7. The slave display device of claim 1, further comprising:
a master display enabler configured to enable the slave display device to be a second master display device in response to the master display device being inactive.

8. The slave display device of claim 7, wherein the signal generator is further configured to transmit the second signal to at least a third display device to synchronize the third display device to the second master display device.

9. A method for phase locked display synchronization performed by a slave display device, comprising:
receiving a first signal that indicates rendering of a first image frame portion of a first image frame by a master display device has at least been initiated;
in response to said receiving the first signal, retrieving a second image frame portion of a first image frame from a frame buffer;
rendering the retrieved second image frame portion to a display screen of the slave display device; and
in response to the rendering of the retrieved second image frame portion, generating a second signal for receipt by a host device to trigger the host device to transmit a second image frame portion of a second image frame to the slave display device.

10. The method of claim 9, wherein the first signal comprises a first tearing effect signal and the second signal comprises a second tearing effect signal.

11. The method of claim 10, wherein the first tearing effect signal is received from the master display device.

12. The method of claim 10, wherein the second tearing effect signal is 360 degrees phase shifted from the first tearing effect signal after a synchronization period.

13. The method of claim 9, further comprising:
disabling a functionality of the external trigger pin to enable the slave display device to operate independently of the master display device.

14. The method of claim 9, further comprising:
enabling the slave display device to be a second master display device in response to the master display device being inactive.

15. The method of claim 14, further comprising:
enabling the second signal to be received by at least a third display device to synchronize the third display device to the second master display device.

16. A master display device, comprising:
a frame buffer that stores a first image frame portion of a first image frame received from a host device;
a frame renderer configured to retrieve the first image frame portion of the first image frame from the frame buffer and render the retrieved first image frame portion to a display screen of the master display device;
a signal output port; and
a signal generator configured to generate a first signal in response to the rendering of the first image frame portion of the first image frame, the first signal output from the output port for receipt by a slave display device to trigger the slave display device to render a second image frame portion of the first image frame to a display screen of the slave display device, the slave display device configured to generate a second signal in response to rendering the second image frame portion of the first image frame for receipt by the host device to trigger the host device to transmit a second image frame portion of a second image frame to the slave display device.

17. The master display device of claim 16, wherein the first signal comprises a first tearing effect signal and the second signal comprises a second tearing effect signal.

18. The master display device of claim 16, further comprising:
an external trigger pin configured to receive a third signal, the third signal configured to trigger the frame renderer to render an image frame portion currently being stored in the frame buffer to the display screen of the master display device.

19. A master display device, comprising:
a frame buffer that stores a first image frame portion of a first image frame received from a host device;
a frame renderer configured to retrieve the first image frame portion of the first image frame from the frame buffer and render the retrieved first image frame portion to a display screen of the master display device;
a signal output port; and
a signal generator configured to generate a first signal in response to the rendering of the first image frame portion of the first image frame, the first output from the output port for receipt by at least one of
a slave display device to trigger the slave display device to render a second image frame portion of the first image frame to a display screen of the slave display device, the slave display device configured to generate a second signal in response to rendering the second image frame portion of the first image frame for receipt by the host device to trigger the host device to transmit a second image frame portion of a second image frame to the slave display device, or
the host device to trigger the host device to transmit a first image frame portion of the second image frame to the master display device,
wherein the first signal comprises a first tearing effect signal and the second signal comprises a second tearing effect signal that is 360 degrees phase shifted from the first tearing effect signal after a synchronization period.

20. The master display device of claim 19, wherein the synchronization period occurs during initial power up of at least one of the master display device or the slave display device.

* * * * *